United States Patent [19]

Yamaguchi et al.

[11] Patent Number: 5,287,628
[45] Date of Patent: Feb. 22, 1994

[54] OMNI RANGE INCLINO-COMPASS

[75] Inventors: Takao Yamaguchi, 22-19, Ouizumi-cho 1-chome, Nerima-ku, Tokyo; Hajime Nishizawa, Urayasu; Toshimi Kumakura, Tokyo, all of Japan

[73] Assignee: Takao Yamaguchi, Tokyo, Japan

[21] Appl. No.: 897,903

[22] Filed: Jun. 12, 1992

[30] Foreign Application Priority Data

Jul. 9, 1991 [JP] Japan .................. 3-168245

[51] Int. Cl.$^5$ .................................. G01C 17/28
[52] U.S. Cl. ............................ 33/361; 364/559
[58] Field of Search ........... 33/361, 362, 366, 313, 33/319; 364/559

[56] References Cited

U.S. PATENT DOCUMENTS

| 4,010,549 | 3/1977 | Crocker et al. ............ 364/559 |
| 4,028,815 | 6/1977 | Buckley et al. ............. 33/366 |
| 4,503,621 | 3/1985 | Fowler ....................... 33/361 |
| 4,642,786 | 2/1987 | Hansen ....................... 364/559 |
| 4,656,750 | 4/1987 | Pitt et al. .................. 33/361 |
| 4,866,384 | 9/1989 | Oetzmann .................... 33/361 |
| 4,920,655 | 5/1990 | Van Steenwyk ................ 33/313 |
| 4,972,593 | 11/1990 | Dahlen et al. .............. 33/361 |
| 5,052,116 | 10/1991 | Oide et al. ................. 33/361 |
| 5,105,548 | 4/1992 | Fowler ....................... 33/361 |
| 5,170,566 | 12/1992 | Fowler et al. .............. 33/361 |

FOREIGN PATENT DOCUMENTS

| 0150622 | 6/1988 | Japan ........................ 33/361 |
| 9206465 | 4/1992 | PCT Int'l Appl. ........... 364/559 |

Primary Examiner—Thomas B. Will
Attorney, Agent, or Firm—Bauer & Schaffer

[57] ABSTRACT

A solid-state omni range incline-compass having a gravity sensor and a geomagnetic flux sensor provided on, each of three orthogonal axes established on a moving body a unit for generating a mathematic horizontal plane by making a gimbal mechanism as a mathematic equation on the basis of outputs from the gravity sensor located on each of the three orthogonal axes and a unit for calculating an azimuth angle of the moving body on the basis of two orthogonal axes on the mathematic horizontal plane.

1 Claim, 5 Drawing Sheets

OMNI RANGE INCLINO-COMPASS

BACKGROUND OF THE INVENTION

1. Field of the Invention

The present invention generally relates to apparatus for measuring an azimuth and an inclination angle and, more particularly, is directed to an omni range incline-compass.

2. Description of the Related Art

In the art, a compass and an inclinometer have been produced as independent units and each mechanism of the compass and the inclinometer has a movable portion. Because the compass and the inclinometer are produced as the respectively independent units as described above, they cannot be used conveniently. Also, the conventional compass and inclinometer have the movable portions as described above and therefore they are poor in durability.

OBJECTS AND SUMMARY OF THE INVENTION

Accordingly, it is an object of the present invention to provide an improved omni range incline-compass in which the aforementioned shortcomings and disadvantages encountered with the prior art can be eliminated.

More specifically, it is an object of the present invention to provide an omni range inclino-compass of solid-state type which has no movable portion.

Another object of the present invention is to provide an omni range inclino-compass of solid-state type in which azimuth angle, front and rear, right and left inclined angles can be measured and indicated in a complex fashion.

According to an aspect of the present invention, a solid-state omni range inclino-compass is comprised of a gravity sensor and a geomagnetic flux sensor provided on each of three orthogonal axes established on a moving body, a device for generating a mathematic horizontal compass by making a gimbal mechanism as a mathematic equation on the basis of outputs from the gravity sensor located on each of the three orthogonal axes, a device for calculating a geomagnetic azimuth angle of the moving body on the basis of two orthogonal axes on the mathematic horizontal compass.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

The present invention will now be described in detail with reference to the accompanying drawings.

Figure 1:
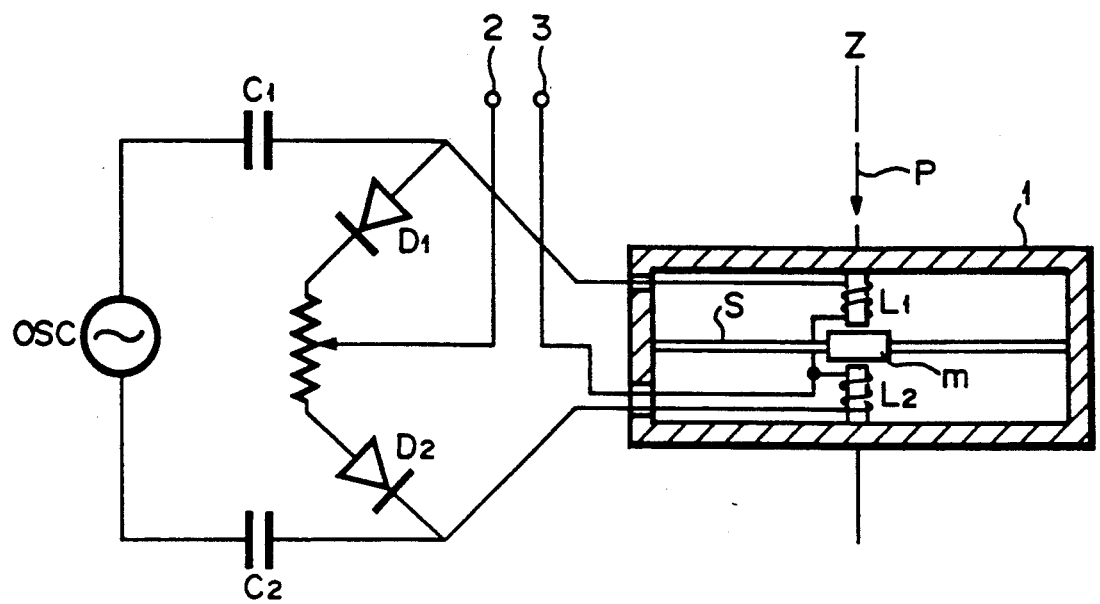
FIG. 1 is a schematic diagram showing in a partly cross-sectional fashion an example of a gravity detecting sensor which is used in an embodiment of the present invention is applied.

FIG. 1 is a schematic diagram showing a partly cross-sectional fashion an example of a gravity detecting sensor used in a measuring unit according to the embodiment of the present invention. In FIG. 1, reference symbol OSC represents a high frequency generating source, $C_1$ and $C_2$ capacitors, $D_1$ and $D_2$ diodes, $L_1$ and $L_2$ coils, each having a dust core, S a circular diaphragm, m a weight made of, for example, brass, 1 a casing, and 2 and 3 output terminals. As shown in FIG. 1, the weight m is attached to the center of the diaphragm S and the diaphragm S is secured at the circumferential edge thereof to the circular inner wall of the casing 1. The coils $L_1$ and $L_2$ form a pair of inductance arms neighboring a bridge circuit having the high frequency generating source OSC. The two rectifiers (diodes) $D_1$ and $D_2$ are unilateral rectifiers as seen from the side of the high frequency generating source OSC and are connected to bridge arms opposing these two inductance arms.

Figure 2:
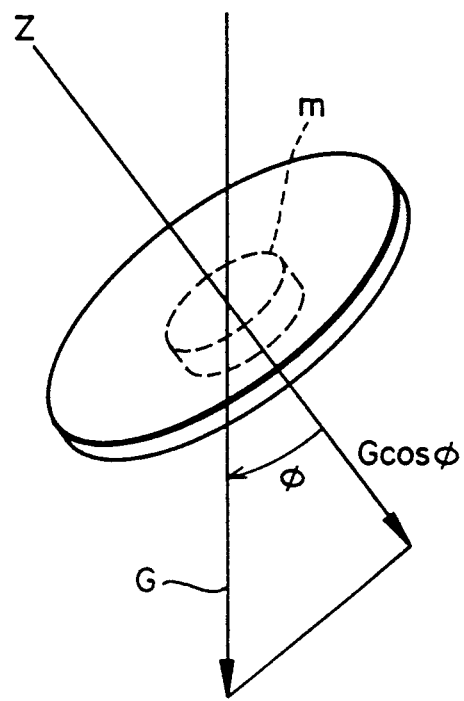
FIG. 2 is a schematic diagram used to explain operation of the gravity sensor of the example shown in FIG. 1.

With the above arrangement, if the weight m of the diaphragm S is displaced by a force P directed from a center line Z direction, a difference is produced at spacings between the coils $L_1$, $L_2$ and the brass metal surfaces of the weight m and hence a difference is produced between the inductances of the coils $L_1$ and $L_2$, whereby an output current is produced between the output terminals 2 and 3. That is, the gravity detecting sensor of this embodiment is operated as a displacement-type sensor. In this case, as shown in FIG. 2, when the center line Z of the sensor forms an angle $\phi$ relative to the direction of gravity G, $G\cos\phi$ is applied to the weight m as the load P so that the output current corresponds with the amount in which the clearance is changed by a load $G\cos\phi$.

Figure 3:
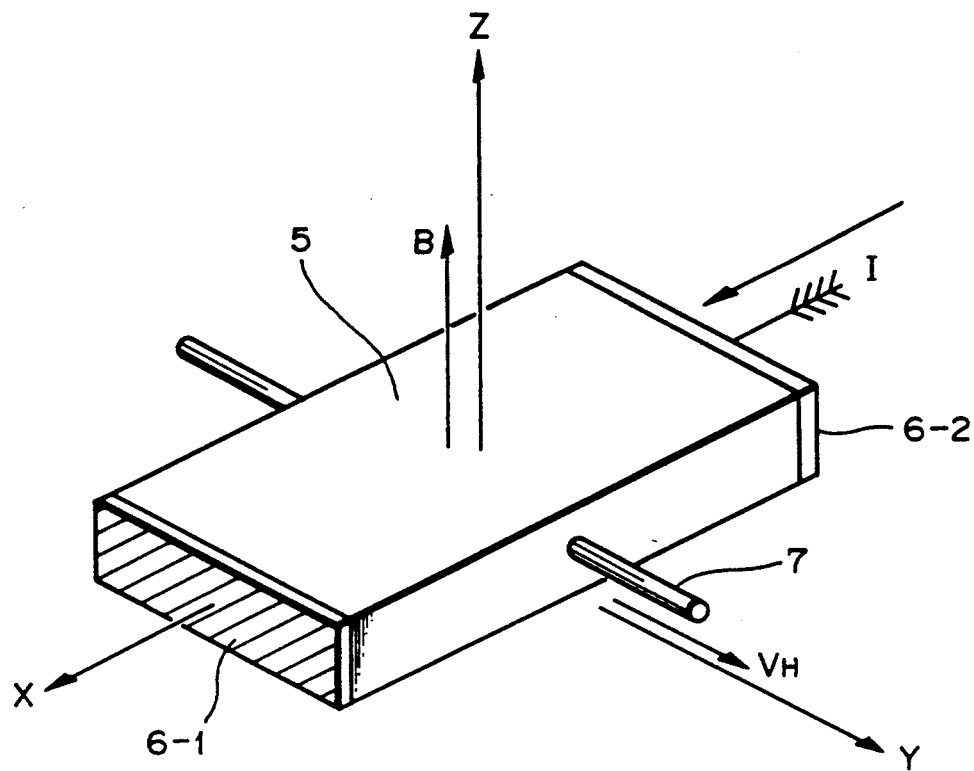
FIG. 3 is a perspective view illustrating an example of a geomagnetic sensor which is used the embodiment of the present invention is applied.
Figure 4:
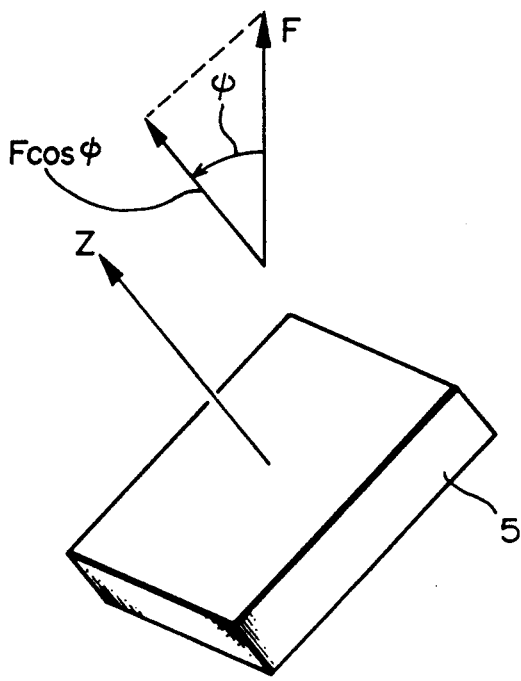
FIG. 4 is a schematic diagram used to explain operation of the geomagnetic sensor of the example shown in FIG. 3.

FIG. 3 is a perspective view illustrating an example of a geomagnetic detecting sensor used in the measuring unit according to the embodiment. The geomagnetic detecting sensor of this embodiment is a well-known Hall element type sensor. In FIG. 3, reference numeral 5 denotes a semiconductor Hall element and reference numerals 6-1, 6-2 and 7 denote electrodes. If a magnetic flux B is applied to the semiconductor Hall element 5 in the direction at a right angle to the major surface thereof while a constant current is flowed through the semiconductor Hall element 5 along the pair of electrodes 6-1 and 6-2, then this geomagnetic detecting sensor produces a voltage $V_H$ in the axial direction at a right angle to both directions of the current I and the magnetic flux B. The electrode 7 derives this voltage $V_H$. In this case, the following equation (1) is established:

$$V_H = K_H \cdot I \cdot B \quad (1)$$

where $K_H$ is the Hall constant.

Accordingly, assuming that $\Psi$ is an angle formed by a rectangular axial line Z of the Hall element 5 relative to a magnetic flux F of the local earth field, then this geomagnetic detecting sensor produces a voltage in proportion to a magnetic flux (corresponding to the above-mentioned magnetic flux B) of $F\cos\Psi$.

While the diaphragm type gravity meter of the high frequency displacement detection system having the weight at the center is employed as the gravity detecting sensor and the Hall element type geomagnetic detecting sensor is employed as the geomagnetic detecting sensor as described above, a gravity meter and a fluxmeter of other types also can be utilized so long as they can provide necessary precision and output.

Figure 5:
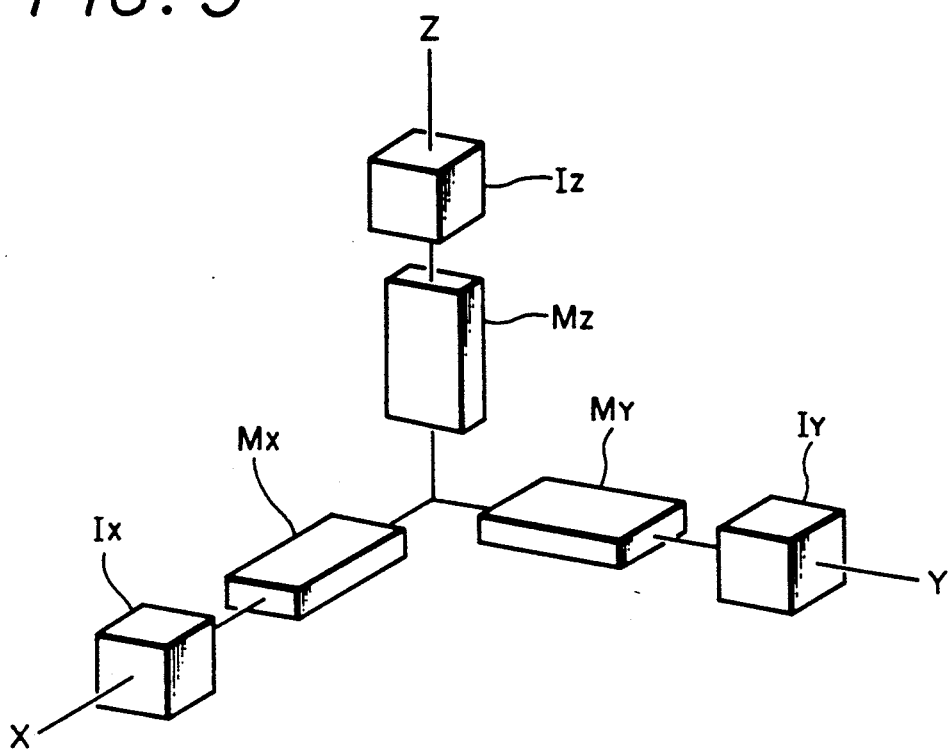
FIG. 5 is a perspective view illustrating a measuring unit of the embodiment of the present invention.

FIG. 5 is a perspective view of the measuring unit according to the embodiment of the present invention. In this embodiment, a pair of the above-mentioned gravity detecting sensor and geomagnetic flux detecting sensor are attached on each of orthogonal three axes X, Y and Z of a moving object (moving object is not limited to vehicles, ships, airplanes and which includes human being) such that the center lines thereof become coincident with three axes X, Y and Z. In FIG. 5, reference symbols $I_X$, $I_Y$ and $I_Z$ represent gravity detecting sensors and $M_X$, $M_Y$ and $M_Z$ represent geomagnetic detecting sensors, respectively which derive gravity divided forces and geomagnetic flux divided forces corresponding to cosine values of the angles formed by the directions of gravity meters and the geomagnetic magnetic flux and the three axes X, Y, Z of the moving object, respectively.

Figure 6:
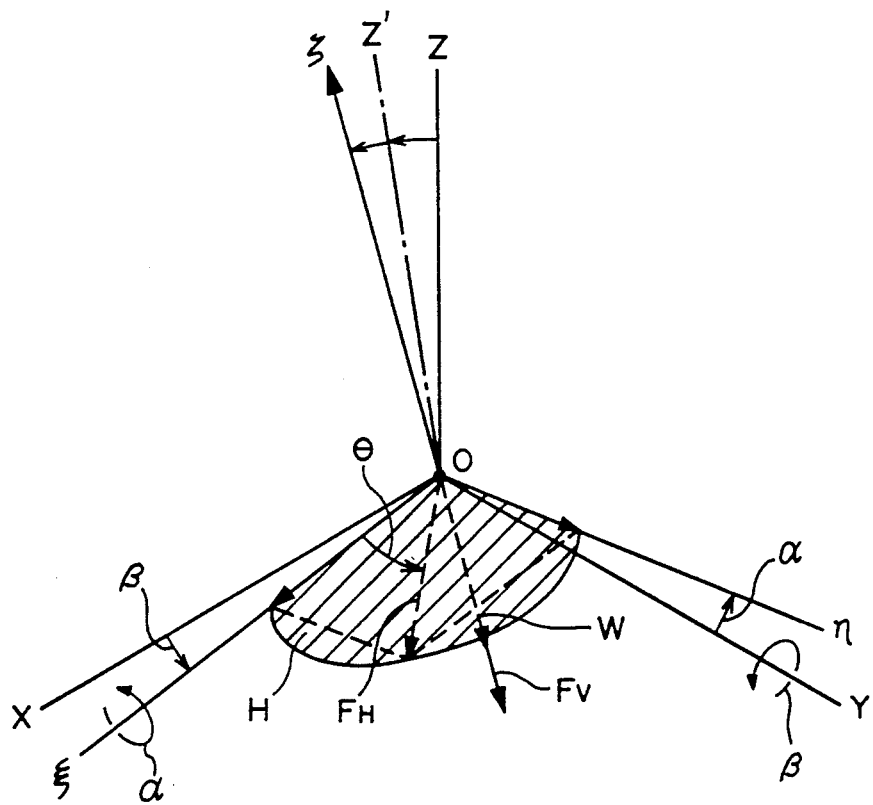
FIG. 6 is a diagram of vectors illustrating a relation between a moving object coordinate O-XYZ and a space coordinate O-$\xi\eta\zeta$ mathematically formed on a moving object according to the embodiment of the present invention.

In this embodiment, on the basis of the outputs of the gravity sensors and magnetic flux sensors disposed on each of the three axes X, Y, Z, a mathematic gimbal type compass whose model is the mechanical type gimbal compass calculates the azimuthal angle and the inclination angle by the moving body on which the embodiment is mounted. Initially, an inclined angle $\beta$ of the deck in the pitching direction and an inclined angle $\alpha$ of the gimbal in the rolling direction are calculated by the gravity detecting sensors located on the three axes. As shown in FIG. 6, it is assumed that the orthogonal coordinate systems O-X'Y'Z' are obtained by rotating the orthogonal three axes coordinate systems O-XYZ about Y axis by $\beta$. Subsequently, it is assumed that the orthogonal three axes coordinate systems O-$\xi\eta\zeta$ are obtained by rotating the orthogonal three axes coordinate systems O-X'Y'Z' about X' axis by $\alpha$. At that time, the $\xi O\eta$ plane of the orthogonal coordinate systems O-$\xi\eta\zeta$, forms a horizontal plane H indicated by surrounding line and the O$\zeta$ line becomes a vertical line. The above coordinate conversion equations are expressed as follows.

$$\begin{vmatrix} X \\ Y \\ Z \end{vmatrix} = \begin{vmatrix} \cos\beta & 0 & \sin\beta \\ 0 & 1 & 0 \\ -\sin\beta & 0 & \cos\beta \end{vmatrix} \begin{vmatrix} x' \\ y' \\ z' \end{vmatrix} \quad (2)$$

$$\begin{vmatrix} x' \\ y' \\ z' \end{vmatrix} = \begin{vmatrix} 1 & 0 & 0 \\ 0 & \cos\alpha & -\sin\alpha \\ 0 & \sin\alpha & \cos\alpha \end{vmatrix} \begin{vmatrix} \xi \\ \eta \\ \zeta \end{vmatrix} \quad (3)$$

$$\begin{vmatrix} X \\ Y \\ Z \end{vmatrix} = \begin{vmatrix} \cos\beta & 0 & \sin\beta \\ 0 & 1 & 0 \\ -\sin\beta & 0 & \cos\beta \end{vmatrix} \begin{vmatrix} 1 & 0 & 0 \\ 0 & \cos\alpha & -\sin\alpha \\ 0 & \sin\alpha & \cos\alpha \end{vmatrix} \begin{vmatrix} \xi \\ \eta \\ \zeta \end{vmatrix} \quad (4)$$

$$\begin{vmatrix} X \\ Y \\ Z \end{vmatrix} = \begin{vmatrix} \cos\beta & \sin\beta \cdot \sin\alpha & \sin\beta \cdot \cos\alpha \\ 0 & \cos\alpha & -\sin\alpha \\ -\sin\beta & \cos\beta \cdot \sin\alpha & \cos\beta \cdot \cos\alpha \end{vmatrix} \begin{vmatrix} \xi \\ \eta \\ \zeta \end{vmatrix} \quad (5)$$

A relation of the equation (5) shows a relation of direction cosine among axes of the orthogonal coordinate systems O-XYZ and O-$\xi\zeta\eta$. A direction cosine table is represented int eh following table 1.

TABLE 1

|     | O$\xi$ | O$\eta$ | O$\zeta$ |
|-----|--------|---------|----------|
| OX  | $\cos\beta$ | $\sin\alpha \sin\beta$ | $\cos\alpha \sin\beta$ |
| OY  | 0      | $\cos\alpha$ | -$\sin\alpha$ |
| OZ  | -$\sin\beta$ | $\sin\alpha \cos\beta$ | $\cos\alpha \cos\beta$ |

Further, as shown in FIG. 6, an azimuth line $F_H$ having an azimuth angle $\theta$ is represented on the horizon $\xi O\eta$ and a gravity line OW and a vertical magnetic flux Fv are represented on the vertical line O$\zeta$.

Figure 7:
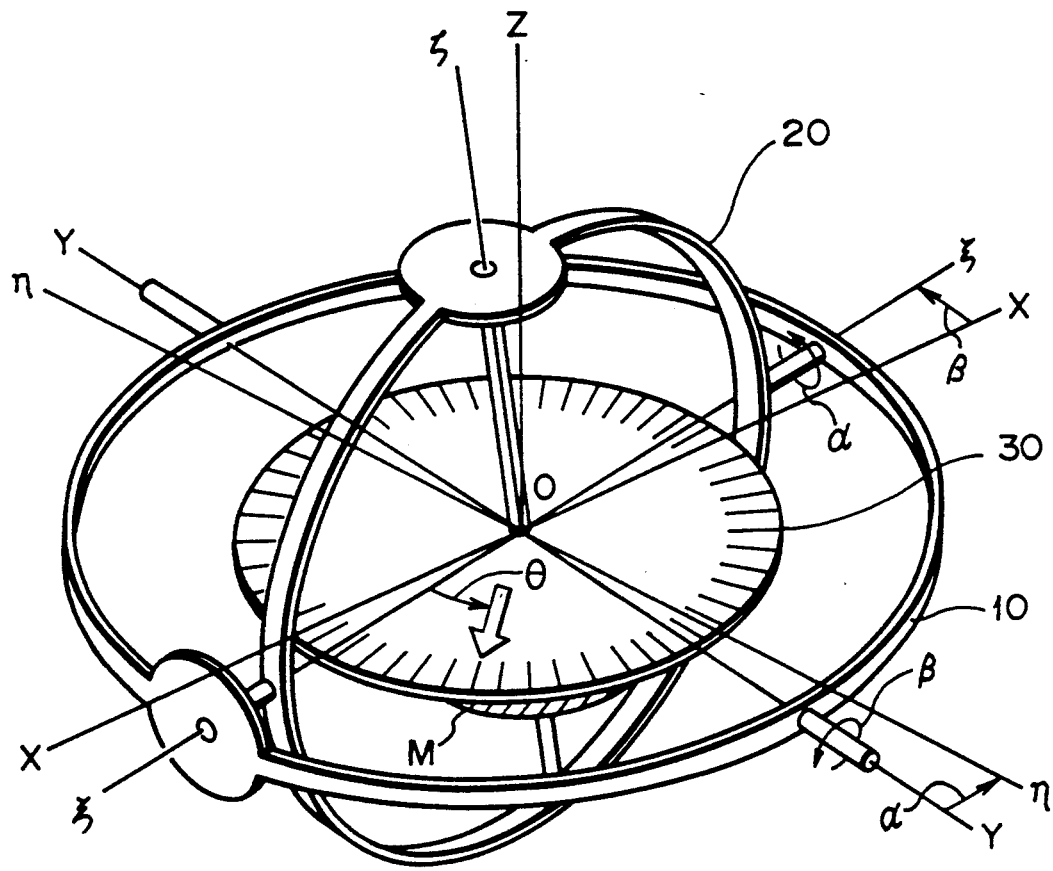
FIG. 7 is a perspective view used to explain a mechanical type gimbal structure which is the model of the mathematic gimbal according to the embodiment of the present invention.

Incidentally, the conversion from the coordinate system O-XYZ of the moving object to the horizontal plane-vertical line coordinate systems O-$\xi\eta\zeta$ can be regarded as the mathematic model of the gimbal support geomagnetic compass having a mechanical type pendulum weight M shown in FIG. 7.

As shown in FIG. 7, an outer gimbal 10 supported by a Y—Y axis (shaft) on the deck of the coordinate system O-XYZ of the moving object is controlled in a pendulum fashion by an angle $\beta$ by the weight M so as to urge the orthogonal $\xi$—$\xi$ axis to seek the horizontal direction. An inner ring 20 supported by the $\xi$—$\xi$ axis (shaft) is similarly controlled in a pendulum fashion by an angle $\alpha$ by the weight M so that the coordinate systems O-$\xi\eta\zeta$ of the inner ring 20 are controlled by the angle $\alpha$ control in addition to the angle $\beta$ control, thereby being kept in the horizontal attitude. A compass card 30 having a compass needle within the inner ring 20 is rotated about the axis O$\zeta$ by an angle $\theta$ to thereby perform the north-seeking operation.

Relations among the gravity sensors and the magnetic flux sensors on the X, Y, Z axes and $\xi$, $\eta$, $\zeta$ axes are expressed by the following conversion equations of mathematic gimbal where $I_1$, $I_2$ and $I_3$ represent outputs of the gravity sensors respective axes of the XYZ axes.

$$I_1 = W\cos\alpha \sin\beta \quad (6)$$

$$I_2 = -W\sin\alpha \quad (7)$$

$$I_3 = W\cos\alpha\cos\beta \quad (8)$$

Assuming that $N_1$, $N_2$ and $N_3$ represent output values of the magnetic flux sensors on the X, Y and Z axes yield the following equations (9), (10) and (11).

$$N_1 = F_H \cos\theta\cos\beta + (F_H \sin\theta\sin\alpha + F_U \cos\alpha)\sin\beta \quad (9)$$

$$N_2 = F_H \sin\theta\cos\alpha - F_U \sin\alpha \quad (10)$$

$$N_3 = -F_H \cos\theta\sin\beta + (F_H \sin\theta\sin\alpha \pm F_U \cos\alpha)\cos\beta \quad (11)$$

As described above, according to this embodiment, since the function of the mathematic gimbal is constructed in the outputs of the gravity sensors and the magnetic flux sensors on the three axes X, Y, Z of the moving object, the azimuth angle, the pitching angle and the rolling angle can be obtained by the mathematic operation among data. The calculation processing will be described below.

(1) Calculation A:

The angles $\alpha$, $\overline{\alpha}$ and $\beta$, $\overline{\beta}$ are obtained initially. In this case, $\alpha$ and $\beta$ assume deck inclination angles, and $\overline{\alpha}$ and $\overline{\beta}$ assume gimbal inclination angles. Then, the following equation (12) is established.

$$\overline{\beta} = \beta, \quad \tan\overline{\alpha} = \tan\alpha \cos\beta \quad (12)$$

Then, from the equations (6) and (8), we have $$\beta = \tan^{-1}(I_1/I_3) \quad (13)$$

$$\alpha = \tan^{-1}(I_2/I_3) \quad (14)$$

$$\overline{\alpha} = \tan^{-1}(\tan\alpha \cos\beta) \quad (15)$$

Then, the output values $N_1$, $N_2$, $N_3$ of the magnetic flux sensors are operated by using the angles $\alpha$ and $\beta$.

(2) Calculation B:

Initially, values of $\cos\beta$ and $\sin\beta$ are put into the output of $N_1$ of the content equation (equation (9)) and the output of $N_3$ of the content equation (equation (11)) and value of $\beta$ is eliminated by calculation equation (equation (16)) and calculation equation (equation (17)), thereby $F_H \cos\theta$ and $N_4$ being calculated.

$$N_1 \cos\beta - N_3 \sin\beta = F_H \cos\theta \quad (16)$$

$$N_1 \sin\beta - N_3 \cos\beta = F_H \sin\theta \sin\alpha + F_V \cos\alpha = N_4 \quad (17)$$

The value $\beta$ is eliminated by the calculation equation (equation (16)) and the calculation equation (equation (17)) in a mathematic fashion, which is equivalent to the fact that the X'Y'Z' axes are established by rotating the Y axis by the angle $\beta$ in the vector diagram of FIG. 6.

Further, this elimination of the value $\beta$ corresponds to the $\beta$ control of the outer gimbal 10 in the mechanism gimbal of FIG. 7.

(3) Calculation C:

Values of $\cos\alpha$ and $\sin\alpha$ are put into the output value of $N_4$ (equation (17)) of the content equation obtained by the calculation B and the sensor output value of $N_2$ (equation (10)) of the content equation and $\alpha$ is eliminated by the calculation of equation (18) to thereby obtain $F_H \sin\theta$.

$$N_4 \sin\alpha = N_2 \cos\alpha = F_H \sin\theta \quad (18)$$

Then, the elimination of $\alpha$ by the calculation of the equation (18) means the fact that the axes $\xi\eta\zeta$ are established by rotating the X' axis of the axes X'Y'Z' by $\alpha$ as seen from the vector diagram of FIG. 6 or the fact that a horizontal plane is established by controlling the internal gimbal by $\alpha$ as seen from the mechanical diagram of FIG. 7.

(4) Calculation D:

Since the coordinate systems $O-\xi\eta\zeta$ are obtained by the calculation C, the azimuth angle $\theta$ is obtained by using $F_H \cos\theta$ of the equation (16) and $F_H \sin\theta$ of the equation (18) according to the following equation (19) within the horizontal plane $\xi O\eta$.

$$\tan^{-1}\left(\frac{F_H \sin\theta}{F_H \cos\theta}\right) = \theta \quad (19)$$

The mathematic processing in the equation (19) represents the synthesis of the azimuth lines $F_H$ in the vector diagram of FIG. 6 and also represents the north seeking operation of the compass needle in the mechanism diagram of FIG. 7.

$\theta$, $\alpha$ and $\beta$ are indicated by the aforementioned calculated results. In this case, although the inclined angle $\beta O$ of the deck in the front to rear direction is always the same as the inclined angle $\beta$ of the gimbal in the front and rear direction, the deck left and right inclined angle $\alpha$ is not the same as the gimbal left and right inclined angle $\overline{\alpha}$.

Figure 8:
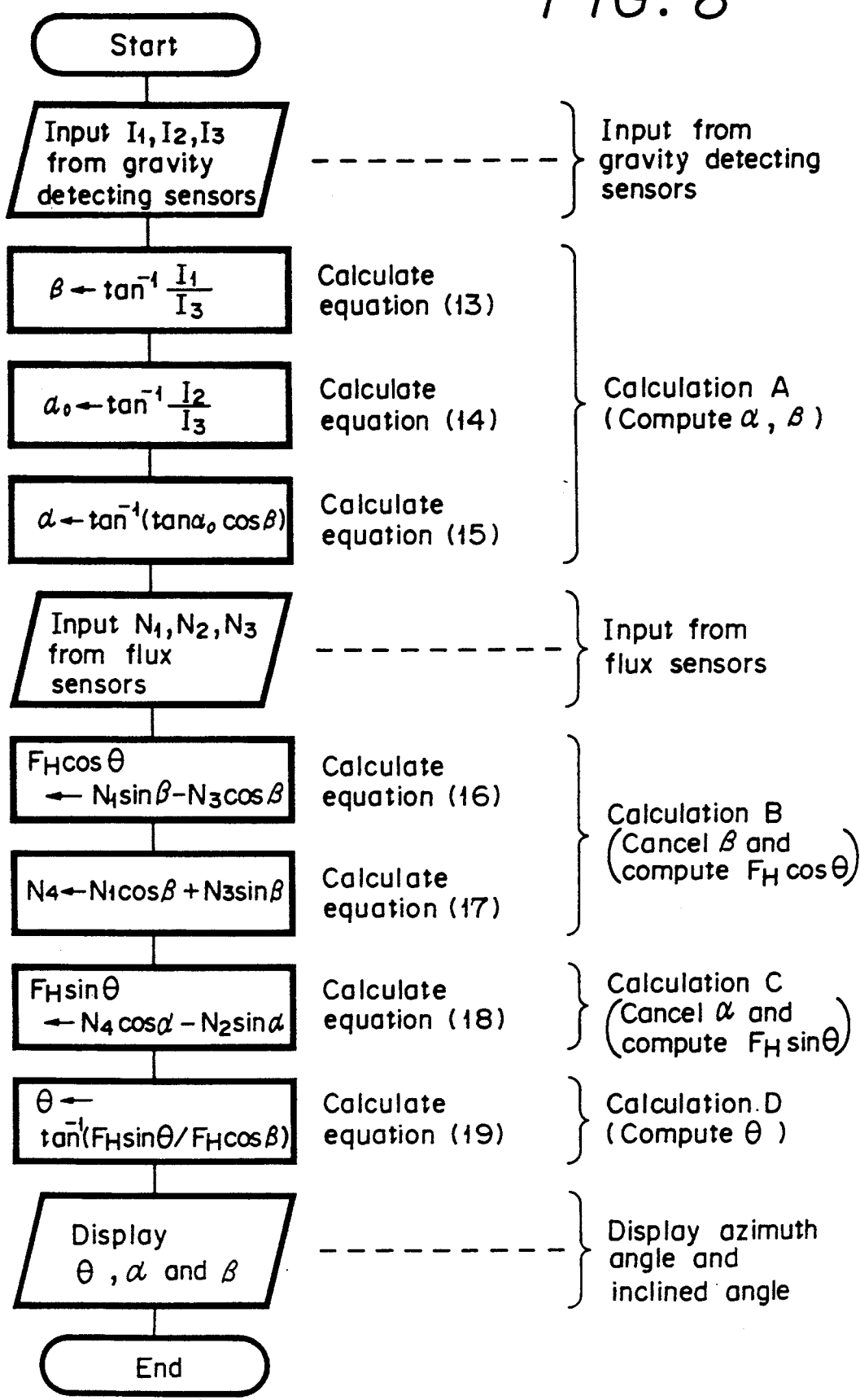
FIG. 8 is a flowchart to which references will be made in explaining the embodiment of the present invention.

Accordingly, when the left and right inclined angle is displayed, it is possible to select one of the inclined angles $\alpha$ and $\overline{\alpha}$ in accordance with the object to be indicated. Generally, the inclined angle $\alpha$ is preferred for indicating the substance and the inclined angle $\overline{\alpha}$ is preferred for the digital indication. In any case, it is preferable that the inclination angle having excellent intuition is selected in accordance with the purpose of indication. The above-mentioned calculation flowchart is represented in FIG. 8.

As described above, according to the present invention, the outputs of the gravity sensors and the outputs of the magnetic flux sensors respectively provided on three axes are calculated by the mathematic gimbal, whereby the azimuth, pitching and rolling inclined angles are calculated and indicated in a complexed fashion. A special computer program is not required to construct the mathematic gimbal and the mathematic gimbal is constructed in the outputs of the six sensors of the magnetic flux sensors and gravity sensors. Therefore, the calculating operation is so simple that it can be sufficiently executed by an 8-bit microcomputer and that the output can be obtained at high speed.

Further, since the gimbal of the present invention is constructed in a mathematic fashion, it is possible to provide an omni range inclined angle and azimuth measuring apparatus which can indicate the azimuth and $\alpha$, $\beta$ or $\overline{\alpha}$, $\overline{\beta}$ can be indicated regardless of the attitude of the moving object, such as U-turn, lateral turning, loop, high speed rotation or the like.

Furthermore, since the entirety of this omni range inclino-compass of the present invention including the sensors respectively provided on three axes is made compact and simple in arrangement, this omni range inclino-compass can be easily mounted on small vehicles and moving objects such as a human body or the like.

According to the present invention, the horizon is obtained by the mathematic gimbal and the program for constructing the mathematic gimbal is included in the outputs of the magnetic flux sensors and gravity sensors. Also, since the inclination angles and azimuth angles are obtained by calculating the outputs, the program can be simplified and the calculation can be made readily.

Since three items of the azimuth, the front and rear inclined angles and right and left inclined angles are indicated by the omni range inclino-compass of the present invention and the mathematic gimbal is constructed, the calculation can be executed at high speed and with high accuracy.

Further, since the omni range inclino-compass of the present invention including the sensor and the computer includes no movable member, the omni range inclino-compass of the present invention can be formed as a portable type compass of small and simple arrangement.

Furthermore, the omni range inclino-compass of the present invention is the composite measuring device which can measure azimuth, front and rear, right and left inclined angles unlike the conventional azimuth compass and inclinometer.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. A solid-state omni range inclino-compass comprising:
   (a) a gravity sensor and a geomagnetic flux sensor provided on each of three orthogonal axes established on a moving body;
   (b) means for generating a mathematic horizontal compass by making a gimbal mechanism as a mathematic equation on the basis of outputs from said gravity sensor located on each of said three orthogonal axes;
   (c) means for calculating an azimuth angle of said moving body on the basis of two orthogonal axes on said mathematic horizontal compass.

* * * * *